US012803850B2

(12) United States Patent
Ramanolla et al.

(10) Patent No.: US 12,803,850 B2
(45) Date of Patent: Nov. 17, 2026

(54) TRANSCEIVER CIRCUIT

(71) Applicant: NXP USA, Inc., Austin, TX (US)

(72) Inventors: Dileep Ramanolla, Hyderabad (IN); Uma Maheswara Reddy Poreddy, Hyderabad (IN); Shivesh Kumar Dubey, Hyderabad (IN)

(73) Assignee: NXP USA, Inc., Austin, TX (US)

( * ) Notice: Subject to any disclaimer, the term of this patent is extended or adjusted under 35 U.S.C. 154(b) by 14 days.

(21) Appl. No.: 19/009,056

(22) Filed: Jan. 3, 2025

(65) Prior Publication Data

US 2025/0267048 A1 Aug. 21, 2025

(30) Foreign Application Priority Data

Feb. 20, 2024 (IN) ............................. 202441011935

(51) Int. Cl.
*H04L 25/49* (2006.01)
*H04L 25/03* (2006.01)

(52) U.S. Cl.
CPC .... *H04L 25/4917* (2013.01); *H04L 25/03025* (2013.01)

(58) Field of Classification Search
CPC ........... H04L 25/4917; H04L 25/03057; H04L 25/030251; H04L 25/03025; H04B 3/14; H04B 3/142; H04B 3/20; H04B 14/023; H04B 1/40; H04B 15/00
See application file for complete search history.

(56) References Cited

U.S. PATENT DOCUMENTS

| | | | | |
|---|---|---|---|---|
| 5,734,598 | A | 3/1998 | Abbott et al. | |
| 8,270,389 | B2 * | 9/2012 | Parnaby | H04L 12/12 370/324 |
| 8,941,420 | B2 | 1/2015 | Zerbe et al. | |
| 9,628,262 | B1 | 4/2017 | Moe | |
| 11,139,800 | B1 | 10/2021 | Weiss et al. | |

(Continued)

OTHER PUBLICATIONS

Den Besten, Gerrit "Line Modulation Considerations for 2.5Gbps and 10 Gbps Automotive Ethernet", NXP Semiconductors, Pittsburgh, May 2018 (19 pages).

(Continued)

*Primary Examiner* — Betsy Deppe

(57) ABSTRACT

A transceiver circuit for transmitting and receiving pulse amplitude modulation, PAM, network signals within a network, wherein the PAM network signals can take a value according to a PAM modulation level of any of two-level modulation, three-level modulation or four-level modulation. The transceiver circuit includes: a receiver-input-terminal for receiving a network signal, an interference cancellation block and an adaptive filtering circuit. The adaptive filtering circuit includes: a filter-input-terminal; a filter-output-terminal; and a plurality of tap weighting blocks. Each tap weighting block includes: a tap-input-terminal, a coefficient-input-terminal and a multiplexer. The adaptive filtering circuit also includes one or more tap summation blocks configured to combine the output of each tap weighting block to provide an interference-error signal to the filter-output-terminal. The interference cancellation block subtracts the interference-error signal from the network signal to provide the processed-network-signal.

10 Claims, 10 Drawing Sheets

(56) References Cited

U.S. PATENT DOCUMENTS

| | | | |
|---|---|---|---|
| 2013/0076433 | A1 | 3/2013 | Fratti |
| 2015/0256363 | A1 | 9/2015 | Shvydun et al. |
| 2021/0036900 | A1 | 2/2021 | Le et al. |
| 2021/0218604 | A1 | 7/2021 | Wu et al. |
| 2023/0362041 | A1 | 11/2023 | Nir |

OTHER PUBLICATIONS

Notice of Allowance for U.S. Appl. No. 19/009,141 dated May 11, 2026; 17 pages.

U.S. Appl. No. 19/009,141 filed Jan. 3, 2025; 43 pages.

* cited by examiner

TRANSCEIVER CIRCUIT

CROSS-REFERENCE TO RELATED APPLICATIONS

This application claims priority under 35 U.S.C. § 119 to Indian Patent Application number 202441011935, filed Feb. 20, 2024, the contents of which are incorporated by reference herein.

FIELD

The present disclosure relates to a transceiver circuit for transmitting and receiving pulse amplitude modulation, PAM, network signals.

SUMMARY

According to a first aspect of the present disclosure there is provided a transceiver circuit for transmitting and receiving pulse amplitude modulation, PAM, network signals within a network, wherein the PAM network signals can take a value according to a PAM modulation level of any of two-level modulation, three-level modulation or four-level modulation, wherein the transceiver circuit comprises:

a receiver-input-terminal for receiving the network signals;

an adaptive filtering circuit comprising:

- a filter-input-terminal for receiving a stream of interference-symbols;
- a filter-output-terminal for providing an interference-error signal;
- a plurality of tap weighting blocks, wherein each tap weighting block comprises:
  - a tap-input-terminal for sequentially receiving the stream of interference-symbols from the filter-input-terminal, such that each tap weighting block receives a different interference-symbol to the interference-symbol received by each other tap weighting block from the stream as a tap-symbol,
  - a coefficient-input-terminal for receiving a coefficient signal, and
  - a multiplexer comprising a plurality of multiplexer-input-terminals, a select-terminal and a multiplexer-output-terminal, wherein: each multiplexer-input-terminal is configured to receive a scaled coefficient signal, and each scaled coefficient signal is a scaled version of the coefficient signal, each scaled by a different integer scaling factor; the select-terminal is connected to the tap-input-terminal such that the multiplexer is configured to set which of the scaled coefficient signals is provided as a tap-output-signal at the multiplexer-output-terminal based on the value of the tap-symbol; and
- one or more tap summation blocks configured to combine the tap-output-signals of each tap weighting block of the plurality of tap weighting blocks in order to provide the interference-error signal to the filter-output-terminal; and an interference cancellation block that is configured to subtract the interference-error signal from the network signal to provide the processed-network-signal.

In one or more embodiments the multiplexer of each tap weighting block comprises five multiplexer-input-terminals.

In one or more embodiments the integer scaling factors are −3, −1, 0, 1 and 3.

In one or more embodiments, the transceiver circuit further comprises an adder. The adder may be configured to add the coefficient signal to itself to provide the 3 and −3 integer scaling factors.

In one or more embodiments, the transceiver circuit further comprises a shift register that is configured to double the coefficient signal. The adder may be configured to add the coefficient signal to the doubled coefficient signal to provide the 3 and −3 integer scaling factors.

In one or more embodiments, the transceiver circuit further comprises:

a slicer connected to the interference cancellation block, configured to compare the processed-network-signal to a plurality of slicer thresholds and provide a received symbol such that the received symbol has one of a plurality of target values associated with the PAM modulation level of the network signals.

In one or more embodiments:

the adaptive filtering circuit comprises a first adaptive filtering circuit comprising:

- a first filter-input-terminal for receiving a first stream of interference-symbols;

a first filter-output-terminal for providing a first interference-error signal;

- a first plurality of tap weighting blocks. Each tap weighting block may comprise:
  - a tap-input-terminal for sequentially receiving the first stream of interference-symbols from the first filter-input-terminal, such that each tap weighting block receives a different interference-symbol to the interference-symbol received by each other tap weighting block from the stream as a tap-symbol,
  - a coefficient-input-terminal for receiving a coefficient signal,
  - a multiplexer comprising a plurality of multiplexer-input-terminals, a select-terminal and a multiplexer-output-terminal, wherein: each multiplexer-input-terminal is configured to receive a scaled coefficient signal, wherein each scaled coefficient signal is a scaled version of the coefficient signal, each scaled by a different integer scaling factor; and the select-terminal is connected to the tap-input-terminal such that the multiplexer is configured to set which of the scaled coefficient signals is provided as a tap-output-signal at the multiplexer-output-terminal based on the value of the tap-symbol;
- one or more first tap summation blocks configured to combine the tap-output-signals of each tap weighting block of the first plurality of tap weighting blocks in order to provide the first interference-error signal to the first filter-output-terminal. The adaptive filtering circuit may also comprise:

a second adaptive filtering circuit comprising;

- a second filter-input-terminal for receiving a second stream of interference-symbols;
- a second filter-output-terminal for providing a second interference-error signal;
- a second plurality of tap weighting blocks. Each tap weighting block may comprise:
  - a tap-input-terminal for sequentially receiving the second stream of interference-symbols from the second filter-input-terminal, such that each tap weighting block receives a different interference-symbol to the interference-symbol received by each other tap weighting block from the stream as a tap-symbol, a coefficient-input-terminal for receiving a coefficient signal, a multiplexer comprising a plurality of multiplexer-input-terminals, a select-terminal and a multiplexer-output-terminal, wherein: each multiplexer-input-terminal is configured to receive a scaled coefficient signal, wherein each scaled coefficient signal is a scaled version of the coefficient signal, each scaled by a different integer scaling factor; and the select-terminal is connected to the tap-input-terminal such that the multiplexer is configured to set which of the scaled coefficient signals is provided as a tap-output-signal at the multiplexer-output-terminal based on the value of the tap-symbol;

one or more second tap summation blocks configured to combine the tap-output-signals of each tap weighting block of the second plurality of tap weighting blocks in order to provide the second interference-error signal to the second filter-output-terminal. Additionally, the first filter-input-terminal may be configured to receive transmission symbols;

the second filter-input-terminal may be configured to receive the received symbol; and the interference cancellation block may be configured to subtract both: i) the first interference-error; and ii) the second interference-error signal from the network signal to provide the processed-network-signal to the slicer.

In one or more embodiments, the transceiver circuit further comprises a coefficient adaption unit, configured to provide the coefficient signal.

In one or more embodiments, the transceiver circuit further comprises a slicer error signal block configured to provide a slicer error signal. The slicer error signal may be the difference between the processed-network-signal and the received symbol. The coefficient adaption unit may comprise:

at least one slicer error input terminal for receiving the slicer error signal, at least one interference symbol input terminal for receiving the stream of interference symbols, a delay block for applying a delay to the stream of interference-symbols to provide a stream of previous-interference-symbols such that the previous-interference-symbols are aligned with the slicer error signal that they represent, or are derived from, and a coefficient-output terminal for providing the coefficient signal;

wherein the coefficient adaption unit is configured to iteratively update the coefficient signal based on the slicer error signal and the aligned stream of previous-interference-symbols.

In one or more embodiments, the coefficient adaption unit is configured to:

apply a plurality of scaling factors to the slicer error signal to create a plurality of scaled slicer error signals, and use the received previous-interference-symbol to select one of the scaled slicer error signals to use to update the coefficient signal.

In one or more embodiments:

the transceiver circuit is configured to:

in a first mode of operation: during a linkup procedure, process two-level modulation PAM network signals, and after the linkup procedure, process three-level modulation PAM network signals, and in a second mode of operation: during a linkup procedure, process two-level modulation PAM network signals, and after the linkup procedure, process four-level modulation PAM network signals.

The transceiver circuit may be configured to be switched between the first mode of operation and the second mode of operation.

In one or more embodiments the network is ethernet.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Pulse amplitude modulation (PAM) is a method of encoding data within a signal wherein the amplitude of a pulse is varied, within a known time frame, to represent a data symbol. To provide a simple example, a pulse with a low amplitude could represent a zero and a pulse with a high amplitude could represent a one. The time frame allocated to each data symbol is constant so that a receiver can understand which pulse represents which symbol in a message.

PAM symbols may represent a wider variety of data than simply zero and one. By implementing different numbers of thresholds, a device can distinguish between different numbers of data symbols that could be represented by a pulse.

Figure 1:
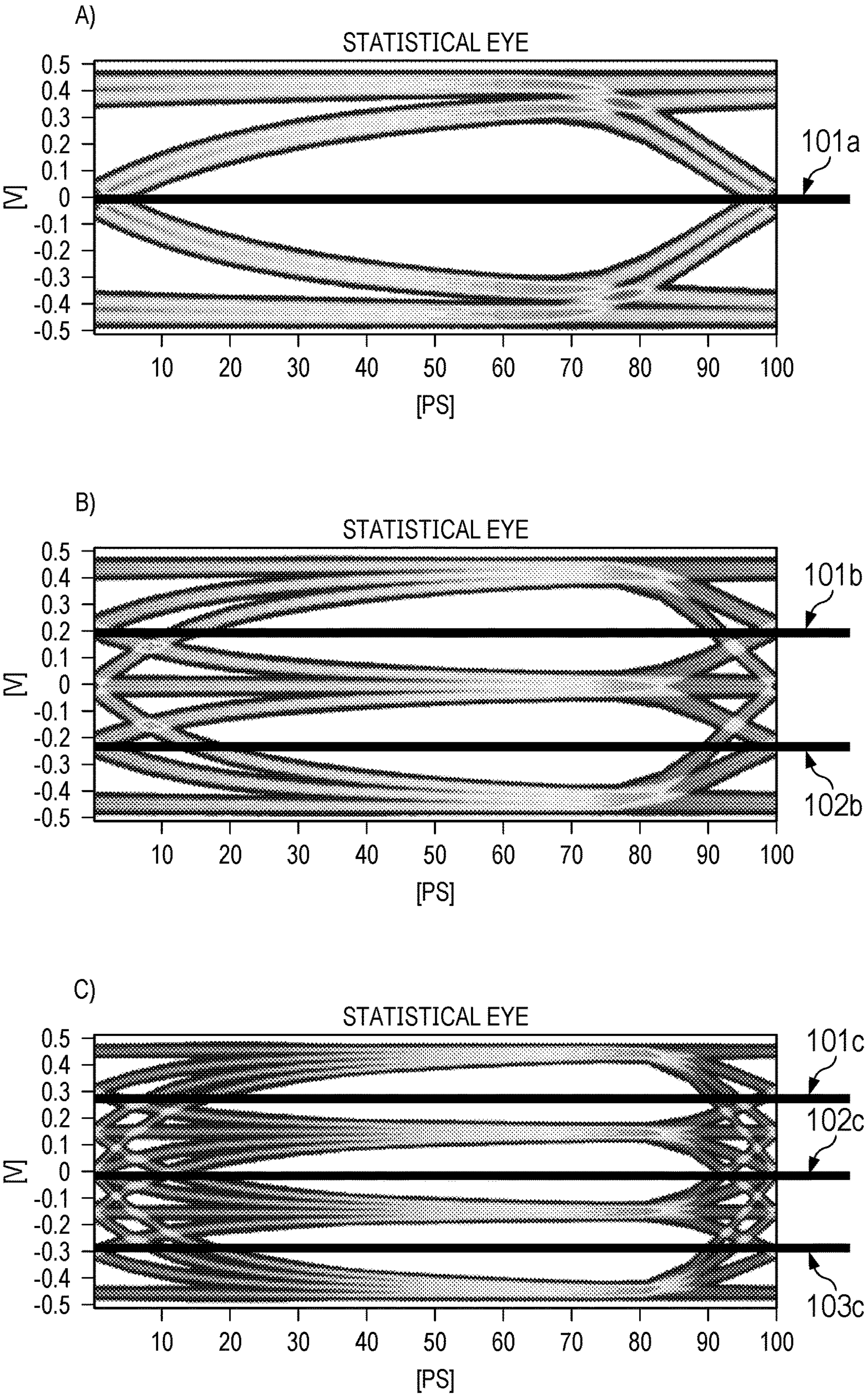
FIG. 1 shows an example of different PAM modulation levels.

FIG. 1 shows an example of different PAM modulation levels. FIG. 1*a*) shows two-level PAM modulation (PAM-2), FIG. 1*b*) shows three-level PAM modulation (PAM-3) and FIG. 1*c*) shows four-level PAM modulation (PAM-4).

A data symbol according to PAM-2 can represent two different values, such that one threshold 101*a* is required to distinguish between the two different values (a first value when the level is above the threshold 101*a*, and a second value when the level is below the threshold 101*a*).

A data symbol according to PAM-3 can represent three different values, such that two different thresholds 101*b*, 102*b* are required to distinguish between the three different values. These thresholds are a high-threshold and a low-threshold. The symbol can have: a first value when the level is above the high-threshold 101*b*, a second value when the level is between the high-threshold 101*b* and the low-threshold 102*b*, and a third value when the level is below the low-threshold 102*b*.

A data symbol according to PAM-4 can represent four different values, such that three different thresholds 101*c*, 102*c*, 103*c* are required to distinguish between the three different values. These thresholds are a high-threshold, a medium-threshold and a low-threshold. The symbol can have: a first value when the level is above the high-threshold 101*c*; a second value when the level is between the high-threshold 101*c* and the middle-threshold 102*c*; a third value when the level is between the middle-threshold 102*c* and the low-threshold 103*c*; and a fourth value when the level is below the low-threshold 102*c*. It will be appreciated that this pattern can continue for all PAM modulation levels higher than four.

Figure 2:
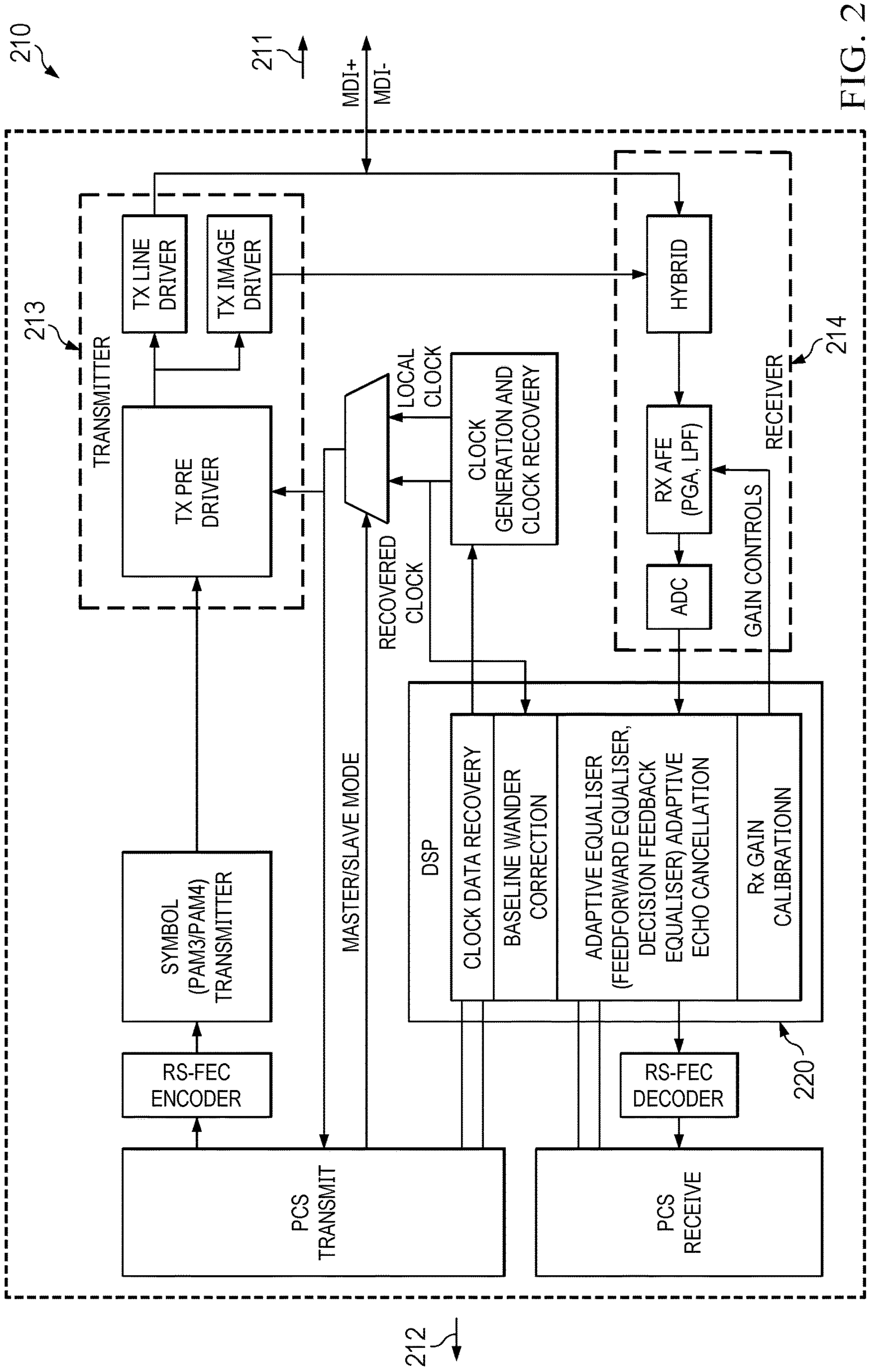
FIG. 2 shows a transceiver according to an embodiment of this disclosure that can be used within an ethernet network.

FIG. 2 shows a transceiver 210 according to an embodiment of this disclosure that can be used within an ethernet network. The transceiver 210 can be used for a half duplex or a full duplex ethernet physical layer. The transceiver 210 is connected to a network bus 211 (as shown by MDI+ and MDI− in FIG. 2) (MDI-media dependent interface) and is connected to a node controller 212. The node controller 212 is configured to: perform operations based on signals received from other nodes in the network over the network bus 211; and also produce symbols for sending to other nodes within the network over the network bus 211.

The transceiver 210 includes a transmitter 213 and a receiver 214, as shown in FIG. 2. To transmit signals onto the network bus 211, the node controller 212 first provides a transmission symbol to the transmitter 213 within the transceiver 210. The transmitter 213 then provides the transmission symbol to the network bus 211. The transmitter 213 may also be configured to perform other operations on the transmission symbol to prepare the transmission symbol for sending over the network such as shifting the level and aligning the transmission symbol with a clock, as is known in the art.

To receive signals from the network bus 211, the receiver 214 within the transceiver 210 receives signals from the network bus 211 and provides the received signals to a digital signal processing unit (DSP) 220. The DSP 220 processes the received signal to provide a received symbol, which represents symbols that have been identified in the received signals, to the node controller. The DSP also includes other operations such as clock data recovery, automatic gain control and echo cancellation. The receiver 214 may also be configured to perform other operations on the received signal to prepare the transmission symbol for further processing by the DSP 220 such as gain amplification and low-pass filtering, as is known in the art.

Figure 3:
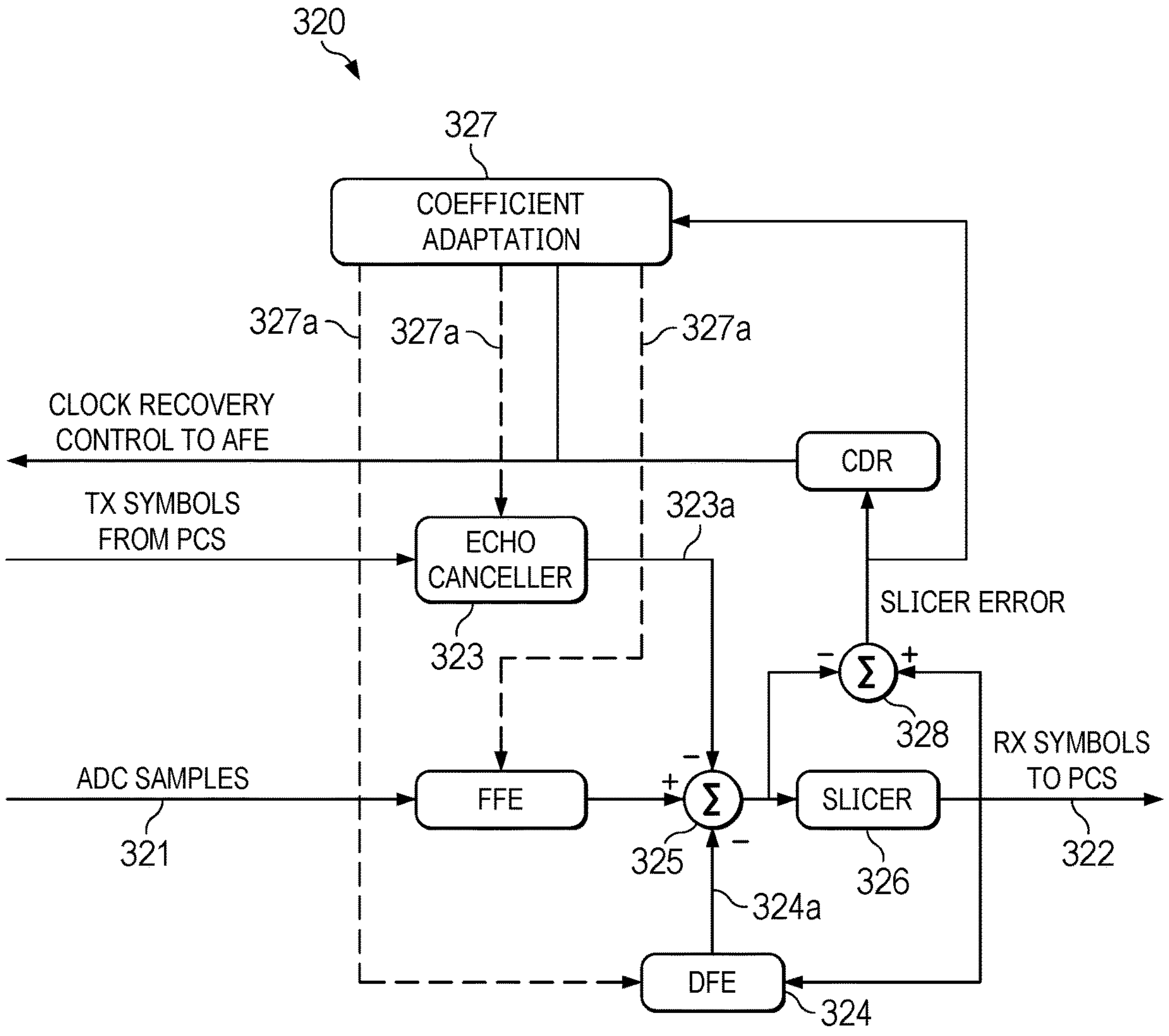
FIG. 3 shows an example Adaptive digital Equaliser, which represents an example implementation of the Adaptive digital Equaliser, according to an embodiment of the present disclosure.

FIG. 3 shows an example Adaptive digital equaliser (ADE) 320, which represents an example implementation of at least part of the DSP of FIG. 2, according to an embodiment of the present disclosure. The ADE is used to perform inverse equalisation of the channel, and the transfer functions of the far end transmission symbols, near end transmission symbols and near end received symbols in order to best estimate the far end transmission symbol. This equalisation is implemented using digital finite impulse response filters, and the coefficients used within the finite impulse response filters are adapted using multiple adaption techniques. The ADE 320 can be used to process PAM network signals that are associated with a plurality of different PAM modulation levels, as described above in reference to FIG. 1. For example, the ADE can process PAM network signals which can take a value according to a PAM modulation level of any one of PAM-2, PAM-3 and PAM-4.

The ADE 320 includes a receiver input terminal 321 and a receiver output terminal 322. The receiver input terminal receives network signals from a receiver (such as the one shown in FIG. 2, but not shown in FIG. 3). The receiver output terminal 322 provides symbols to the node controller (not shown).

The ADE 320 in this example includes two adaptive filtering circuits: an echo canceller 323 and a decision feedback equaliser (DFE) 324. In other examples, only a single adaptive filtering circuit may be used. The adaptive filtering circuits determine and provide an interference error signal 323*a*, 324*a*, which is representative of interference within the received network signal. As will be discussed in more detail below, the echo canceller 323 provides an interference error signal 323*a* that represents echo symbols on the network bus. The DFE 324 provides an interference error signal 324*a* that can correlate with the far end transmitted signals and can be cancelled using adaptive finite impulse response for a better estimation of far end transmission signals. The ADE 320 also includes an interference cancellation block 325 that subtracts the interference error signals 323*a*, 324*a* from the network signal to provide a processed network signal.

The ADE 320 in this example also includes a slicer 326, which is connected between the interference cancellation block 325 and the receiver output terminal 322. The slicer 326 compares the processed network signal to a one or more slicer thresholds (depending upon which PAM modulation levels are being used) to provide a received symbol to the receiver output terminal 322. In this way, the received symbol has one of a plurality of target values associated with the PAM modulation level of the network signals.

In this example, the echo canceller 323 receives transmission symbols (TX symbols) from the node controller (not shown) and uses the transmission symbols to determine an echo interference error signal 323*a*, which can be subtracted from the received network signals in order to reduce the undesirable effects of echo signals that are present on the network bus. The DFE 324 receives received symbols from the output of the slicer 326 and uses the received symbols to determine an ISI interference error signal 324*a*, which can be subtracted from the received network signals in order to reduce the undesirable effects of inter-symbol interference on the network bus.

The ADE 320 also includes a coefficient adaption unit 327. The coefficient adaption unit 327 provides a coefficient signal 327*a* to the echo canceller 323 and the DFE 324. As will be discussed in detail below, the coefficient signal 327*a* is used by the echo canceller 323 and the DFE 324 to determine their respective interference error signals.

In this example, the DSP 320 also includes a slicer error block 328 connected to a slicer input terminal and a slicer output terminal. The slicer error block 328 is configured to provide a slicer error signal. The slicer error signal is the difference between the processed network signal and the received symbol (i.e., the difference between the input signal to, and the output signal of, the slicer error block 328). The slicer error signal block 328 provides the slicer error signal to the coefficient adaption block 327. In this example, the coefficient adaption block 327 uses the slicer error signal to produce the coefficient signal 327*a*. As will be discussed below with reference to FIG. 7, the coefficient adaption block 327 can iteratively update the coefficient signal 327*a* based on the slicer error signal.

The DSP may also include additional components for the purpose of processing signals such as a high pass filter and a feed-forward equaliser.

Figure 4:
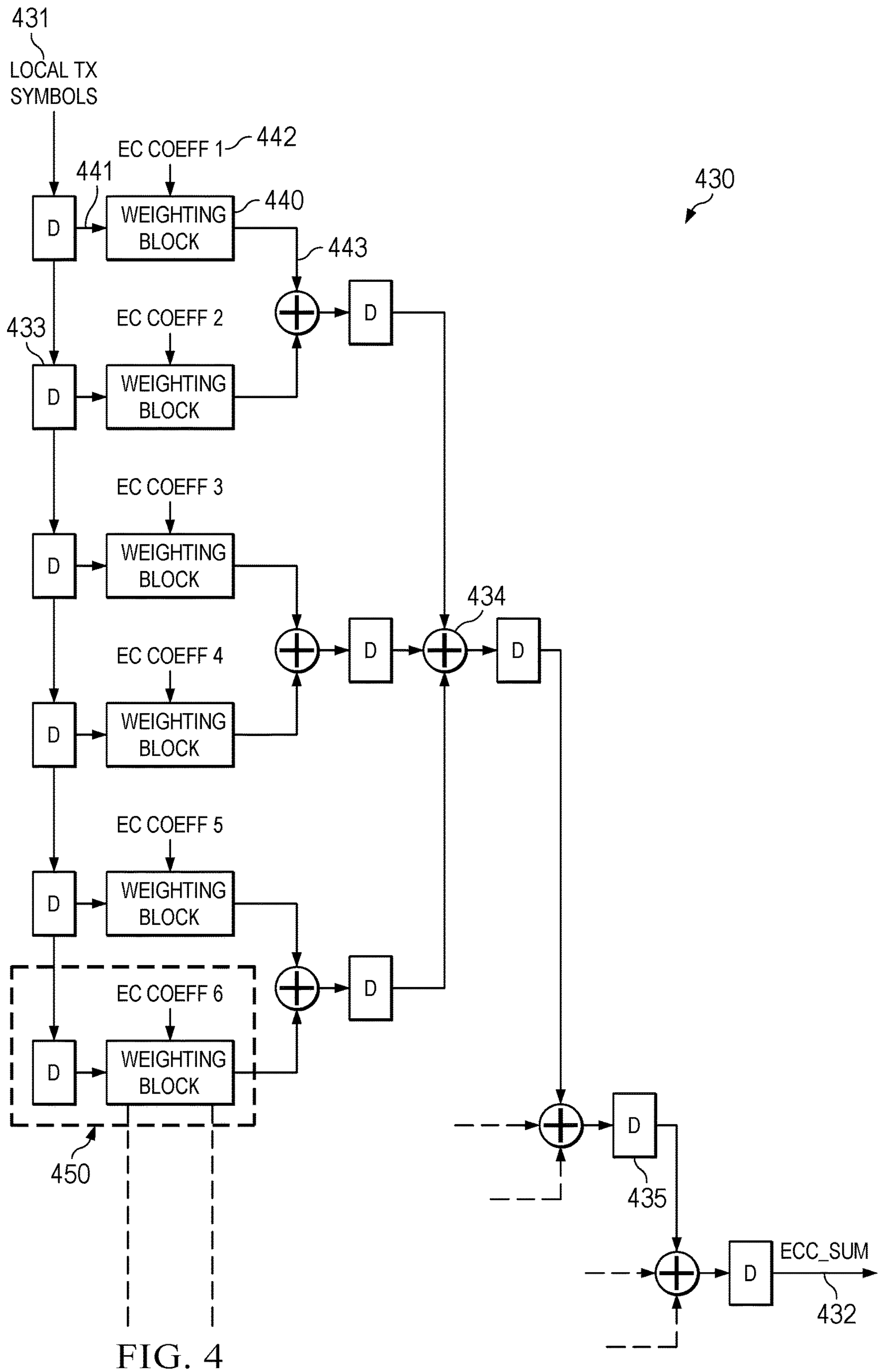
FIG. 4 shows a structure for an adaptive filtering circuit which may be used within the echo canceller or DFE described in relation to FIG. 3, according to an embodiment of the present disclosure.

FIG. 4 shows a structure for an adaptive filtering circuit 330 which may be used within the echo canceller or DFE described in relation to FIG. 3, according to an embodiment of the present disclosure. In this example, the adaptive filtering circuit 330 is a finite impulse response adaptive filtering circuit. The adaptive filtering circuit 430 has a filter input terminal 431, a filter output terminal 432 and a plurality of taps 450. The number of taps 450 required depends upon the type of channel used. In order to provide a useable output, there is a need for a significant number of taps, for example 100-500. The filter input terminal 431 receives a stream of interference symbols and the filter output terminal 432 provides the interference error signal, the specific details of these signals depend on the type of adaptive filtering circuit being used (see the discussion of FIG. 3).

The adaptive filtering circuit 430 also includes a plurality of tap weighting blocks 440 which are repeated per tap of the adaptive filtering circuit. Each tap weighting block 440 has a tap input terminal 441, a coefficient input terminal 442 and a tap output terminal 443. In this example, the adaptive filtering circuit includes a delay block 433 connected to the receiver input terminal and the tap input terminal 441 of each tap weighting block 440. The delay blocks 433 are connected in series and in this way, the tap weighting blocks 440 are connected in parallel to one another.

The tap input terminal 441 of each tap weighting block 440 sequentially receives the stream of interference symbols from the filter input terminal 431, such that each tap weighting block receives a different interference symbol to the interference symbol received by each other tap weighting block 440 from the stream as a tap symbol. That is, the delay blocks 433 provide an interference symbol to each tap weighting block 440 at the same instant in time such that the first tap weighting block 440 receives the current interference symbol, the second tap weighting block 440 receives the previous interference symbol, the third tap weighting block 440 receives the interference symbol before the previous interference symbol, and so on.

The coefficient input terminal 442 of each tap weighting block receives a coefficient signal. The coefficient signal may be different for each tap weighting block 440 or the same for each tap weighting block 440. Each tap weighting block 440 uses the tap symbol and the coefficient signal to provide a tap output signal to the tap output terminal 443. How the tap weighting block uses the tap symbol and the coefficient signal to provide a tap output signal will be described later, in relation to FIG. 9.

The adaptive filtering circuit 430 also includes one or more summation blocks 434 to combine the tap output signals of each tap weighting block 440 in order to provide the interference error signal to the filter output terminal 432. The number of summation blocks 434 depends on the number of tap weighting blocks 440 in the adaptive filtering circuit. In this example, an additional delay block 435 is connected to the output terminals of each summation block 434. FIG. 4 shows an architecture in which summation blocks 434 and additional delay blocks 435 are repeated until all of the tap output signals are combined at the filter output terminal 432 of the adaptive filtering circuit 430.

It is advantageous for signals having multiple different PAM modulation levels to be processable by a single adaptive filtering circuit common hardware. For example, the ethernet protocol supports a number of different PAM modulation levels which are used depending on the specific requirements of different applications. In automotive ethernet for 1000base-T1, a node within a network performs link training in a PAM-2 mode, and then post link training the link switches from PAM-2 to PAM-3 in 1000base-T1 mode. For post link training in 2500base-T1, the link switches from PAM-2 to PAM-4. Therefore, it can be beneficial for a transceiver to possess the capability to operate within a plurality of PAM modulation levels using the same hardware, even if the transceiver is intended for use within only one type of network. However, such operation, using a plurality of PAM modulation levels, can be difficult to efficiently achieve.

Figure 5:
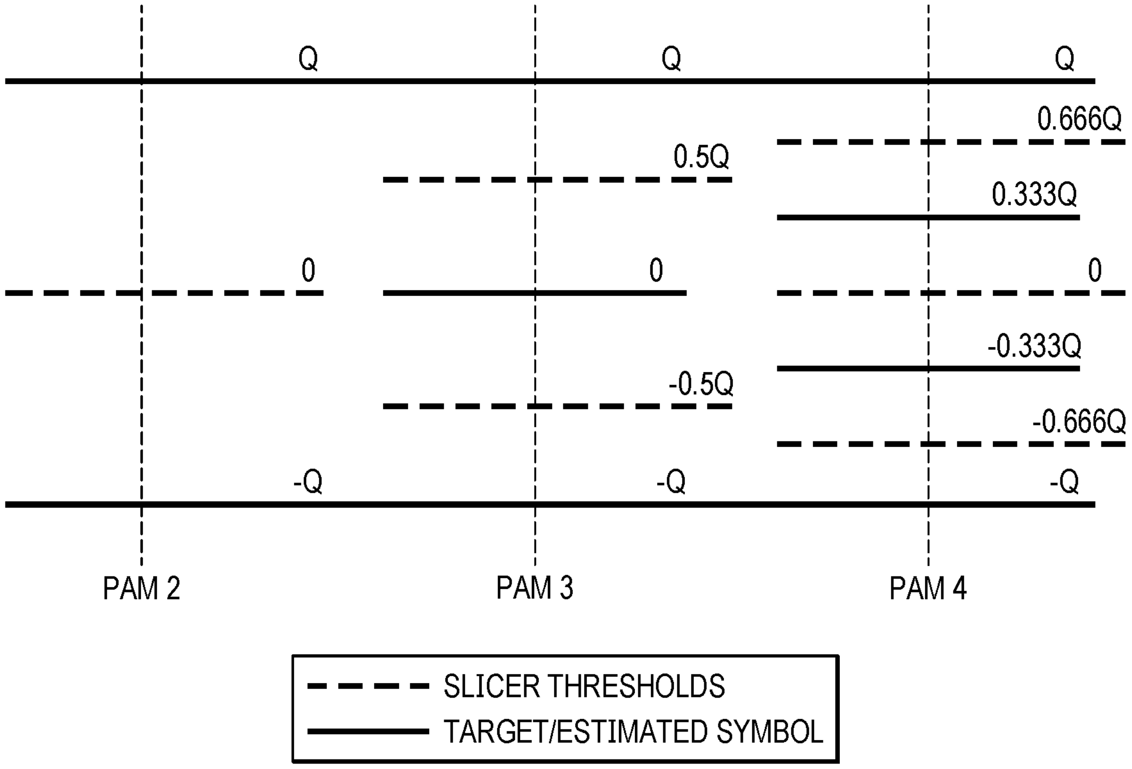
FIG. 5 shows target symbol levels and associated thresholds for different PAM modulation levels within ethernet using 1× Slicer normalisation.

FIG. 5 shows target symbol levels and associated thresholds for different PAM modulation levels within ethernet using 1× normalisation. In this example, the target symbol levels (and associated thresholds) have been normalised with respect to PAM-2, PAM-3 and PAM-4 so that the same hardware can be used within each scheme without modification. The target symbol levels and thresholds required for PAM-2 and PAM-3 are relatively straightforward to implement electronically. PAM-2 only requires target symbol levels of 1 or −1 times the normalised digital value Q, these values can be distinguished using a threshold value of 0. PAM-3 requires target symbol levels of 1, 0 or −1 times Q, in this case the thresholds required are 0.5Q and −0.5Q. These values are simple to implement digitally. However, PAM-4 requires target symbol levels of Q/3, Q, −Q/3 and −Q, with thresholds at 2Q/3, 0 and −2Q/3. These recurring fractional target levels demand the use of multipliers to implement in hardware. Also, the fractional threshold values need higher fractional bits to implement in hardware. These hardware constraints introduce an inefficiency into the circuit. Therefore, in order to support PAM-4, both the tap weighting blocks and coefficient adaption units (within the coefficient adaption block) can be implemented with multipliers (this implementation will be described in detail later in reference to FIGS. 6 and 7). Multiplier circuits are complex to implement and their use can occupy significant area on the integrated circuit and significant power consumption.

Figure 6:
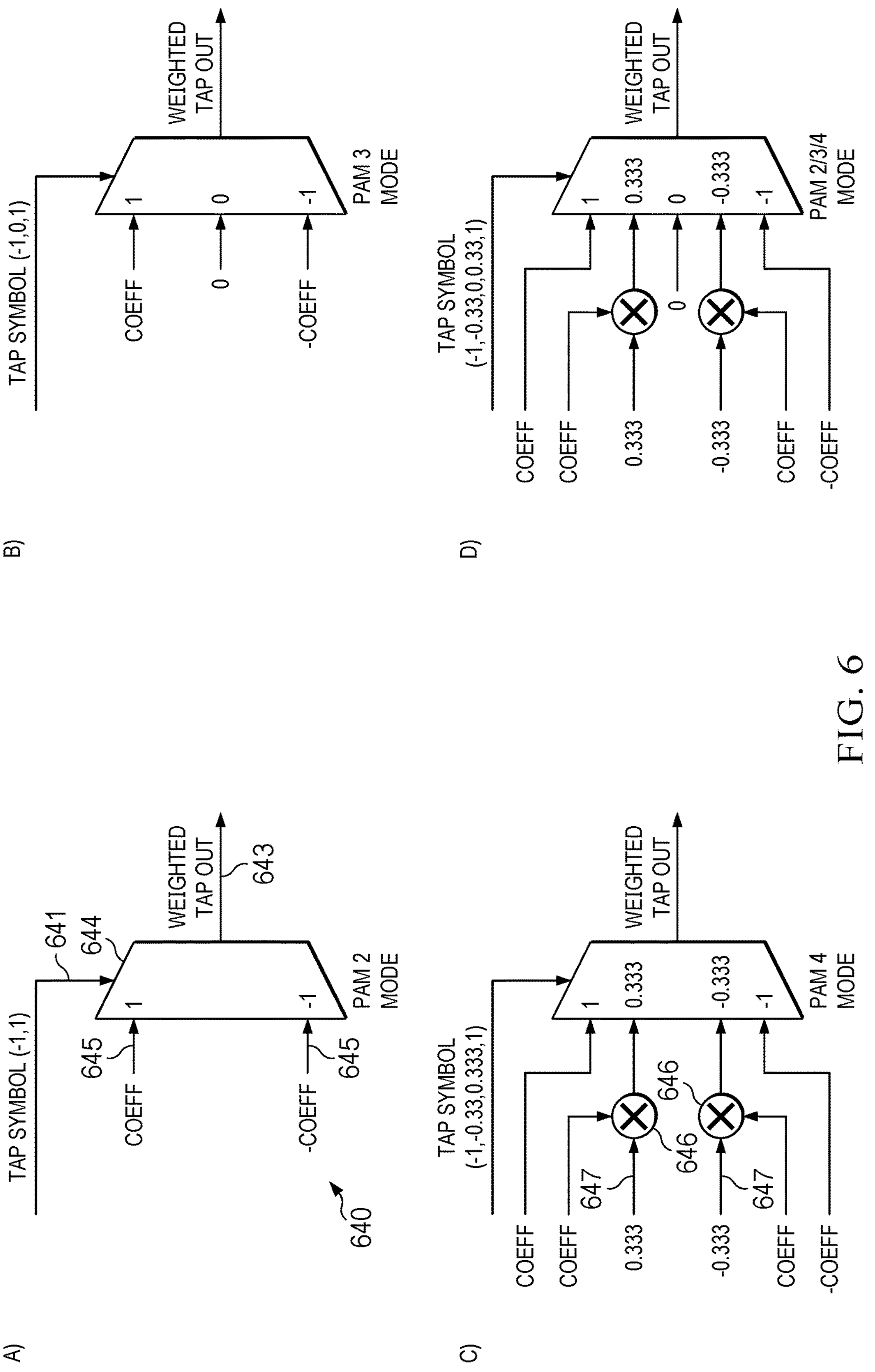
FIG. 6 shows example implementations of a tap weighting block using the thresholds according to FIG. 5.

FIG. 6 shows example implementations of a tap weighting block 640 using the thresholds according to FIG. 5. FIG. 6*a*) shows a tap weighting block 640 suitable for use within PAM-2. FIG. 6*b*) shows a tap weighting block suitable for use within PAM-3. FIG. 6*c*) shows a tap weighting block suitable for use within PAM-4. FIG. 6*d*) shows a tap weighting block suitable for use within PAM-2, PAM-3 and PAM-4.

Each tap weighting block 640 follows a similar format. They each include a multiplexer 644 with a plurality of multiplexer input terminals 645, a select terminal 641 and a multiplexer output terminal 643.

Each multiplexer input terminal 645 receives a scaled coefficient signal which is a version of the coefficient signal (received from the coefficient input of the tap weighting block) which has been scaled by a different scaling factor. The scaling factors correspond to the target values for an appropriate PAM modulation level. For a PAM-2 tap weighting block, the scaling factors are −1 and 1, for a PAM-3 tap weighting block, the scaling factors are −1, 0 and 1, for a PAM-4 tap weighting block the scaling factors are −1, −⅓, ⅓ and 1 and for a PAM-2/3/4 tap weighting block the scaling factors are −1, −⅓, 0, ⅓ and 1. In this way, the PAM-2/3/4 tap weighting block is able to utilise any scaling factor which is required by any of PAM-2, PAM-3 or PAM-4.

The select terminal 641 is connected to the tap input terminal of the tap weighting block 640 and uses the value of a tap symbol received by said tap input terminal to set which of the scaled coefficient signals is provided as a tap output signal at the multiplexer output terminal 643. The multiplexer output terminal 643 is connected to the tap output terminal of the tap weighting block.

In this way, the adaptive filtering circuit can build an interference error signal from coefficient signals which have been appropriately scaled based on the interference signals which are being received.

A tap weighting block for use within PAM-4 (FIGS. 6*c*) and 6*d*)) requires multiplier circuits 646 that multiply the received coefficient signal (Coeff) by ⅓ 647 in order to produce the scaled coefficient signal multiplexer input signals that are used for PAM-4. As mentioned previously, these multiplier circuits 646 require a significant amount of space and power usage. A large number of tap weighting blocks can be provided within the adaptive filtering circuit, and therefore the amount of space and power required for an individual multiplier circuit can have a large cumulative effect on the efficiency of the transceiver as a whole.

Figure 7:
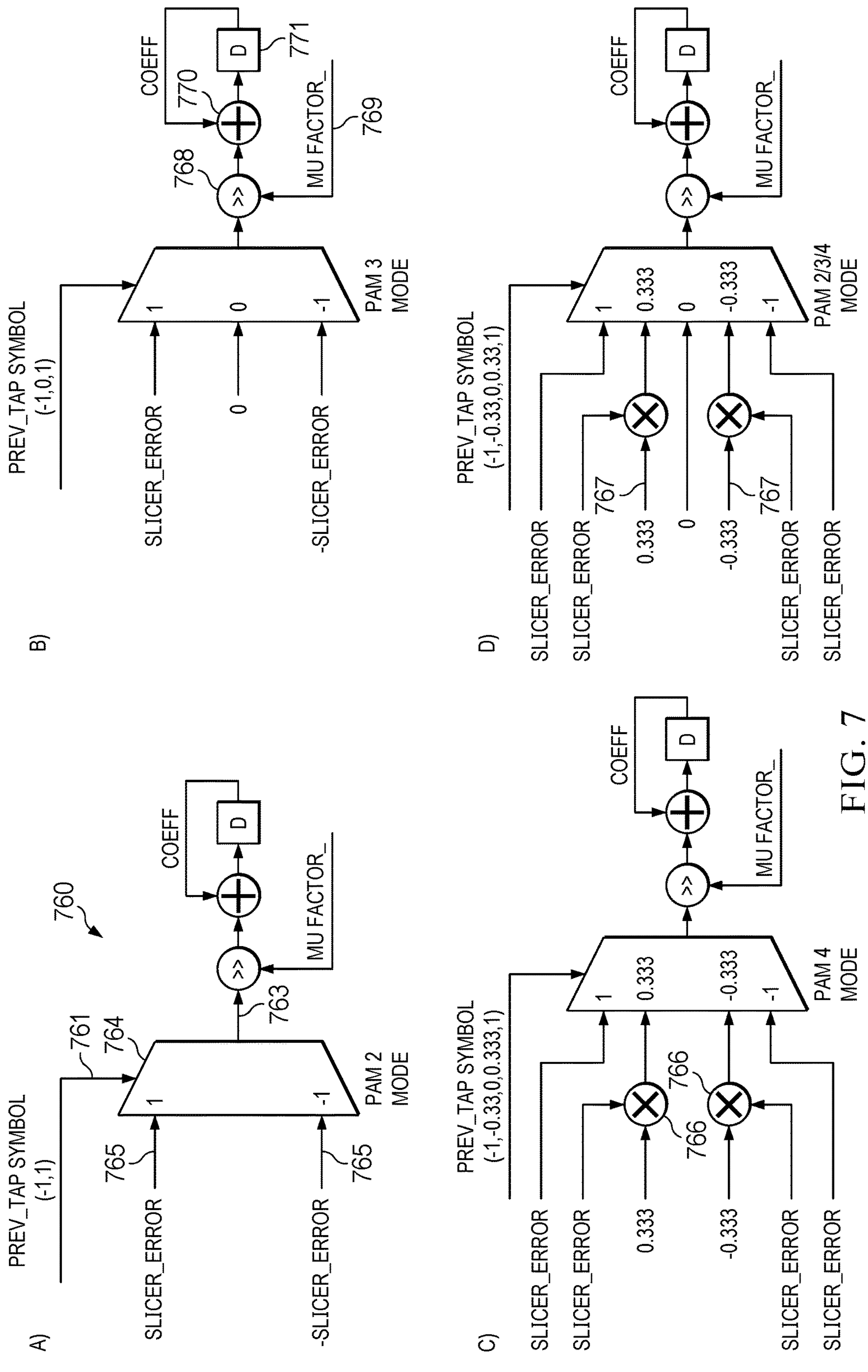
FIG. 7 shows example implementations of a coefficient adaption unit, which is a functional part of the coefficient adaption block of FIG. 3, using the slicer thresholds according to FIG. 5.

FIG. 7 shows example implementations of a coefficient adaption unit, which is a functional part of the coefficient adaption block of FIG. 3, using the thresholds according to FIG. 5. FIG. 7*a*) shows a coefficient adaption unit 760 suitable for use with PAM-2. FIG. 7*b*) shows a coefficient adaption unit suitable for use with PAM-3. FIG. 7*c*) shows a coefficient adaption unit suitable for use with PAM-4. FIG. 7*d*) shows a coefficient adaption unit suitable for use with PAM-2, PAM-3 and PAM-4.

Similarly to the tap weighting blocks described in relation to FIG. 6, each coefficient adaption unit 760 follows a similar format, in that they each include a multiplexer 764 with a plurality of multiplexer input terminals 765, a select terminal 761 and a multiplexer output terminal 763.

Each multiplexer input terminal 765 receives a scaled slicer error signal which is a version of the slicer error signal (received from a slicer error input terminal connected to the slicer error block) which has been scaled by a different scaling factor. The scaling factors correspond to the target values for an appropriate PAM modulation level. For a PAM-2 coefficient adaption unit, the scaling factors are −1 and 1, for a PAM-3 coefficient adaption unit, the scaling factors are −1, 0 and 1, for a PAM-4 coefficient adaption unit the scaling factors are −1, −⅓, ⅓ and 1 and for a PAM-2/3/4 coefficient adaption unit the scaling factors are −1, −⅓, 0, ⅓ and 1. In this way, the PAM-2/3/4 coefficient adaption unit is able to utilise any scaling factor which is required by any of PAM-2, PAM-3 or PAM-4.

The select terminal 761 uses the value of a previous tap symbol to set which of the scaled slicer error signals is provided as an output signal at the multiplexer output terminal 763. As is clear from the structure of the adaptive filtering circuit, a slicer error signal represents a particular interference symbol after a period of time since said interference symbol was received by the adaptive filtering circuit. That is, it takes a finite period of time for a received interference symbol to be processed before the corresponding slicer error signal is produced. Therefore, in order for the coefficient adaption unit 760 to process: i) an interference symbol; and ii) a slicer error signal that corresponds to the same interference symbol, a delay block (not shown) is used to apply a delay to the received stream of interference symbols to provide a stream of previous tap symbols. The stream of previous tap symbols is aligned with the received slicer error signal that is received by the coefficient adaption unit, such that they represent or are derived from the same symbols in the received stream of interference symbols.

Similarly to the tap weighting blocks described in relation to FIG. 6, the coefficient adaption units for use with PAM-4 (FIGS. 7*c*) and 7*d*)) require multiplier circuits 766 that multiply the received slicer error signal (slicer_error) by ⅓ 767 in order to produce the scaled slicer error signal multiplexer input signals. As mentioned previously, these multiplier circuits 766 require a significant amount of space and power usage, which has a large cumulative effect on the efficiency of the transceiver as a whole.

The multiplexer output terminal 763 is connected to one or more right shift operator 768 that divides the output signal that is provided by the multiplexer by two a number of times defined by a mu factor 769 to produce a coefficient signal. For example, if the mu factor is 2, then the multiplexer output signal is right shifted by two binary bits, i.e., divided by (2^2)=4. In this way, the multiplexer output signal is divided by 2 to power of the mu factor, as represented by the right shift operator 768. The output of the right shift operator 768 is connected to an adder 770 which is configured to cumulatively add the coefficient signal to itself at regular intervals, as defined by a delay block 771. This structure is a well-known implementation of least mean square adaptation in the art, and therefore we will not describe it in any more detail here.

In this way, the coefficient adaption unit is configured to use the received previous interference symbols to select one of the scaled slicer error signals to use to iteratively update the coefficient signal. The coefficient adaption block that is shown in FIG. 3 can contain one or more coefficient adaption units. For example, there can be one coefficient adaption unit per tap of the adaptive filtering circuit, or one coefficient adaption unit for multiple taps of the adaptive filtering circuit, used to update the coefficient of each tap according to a time division/round robin method.

Figure 8:
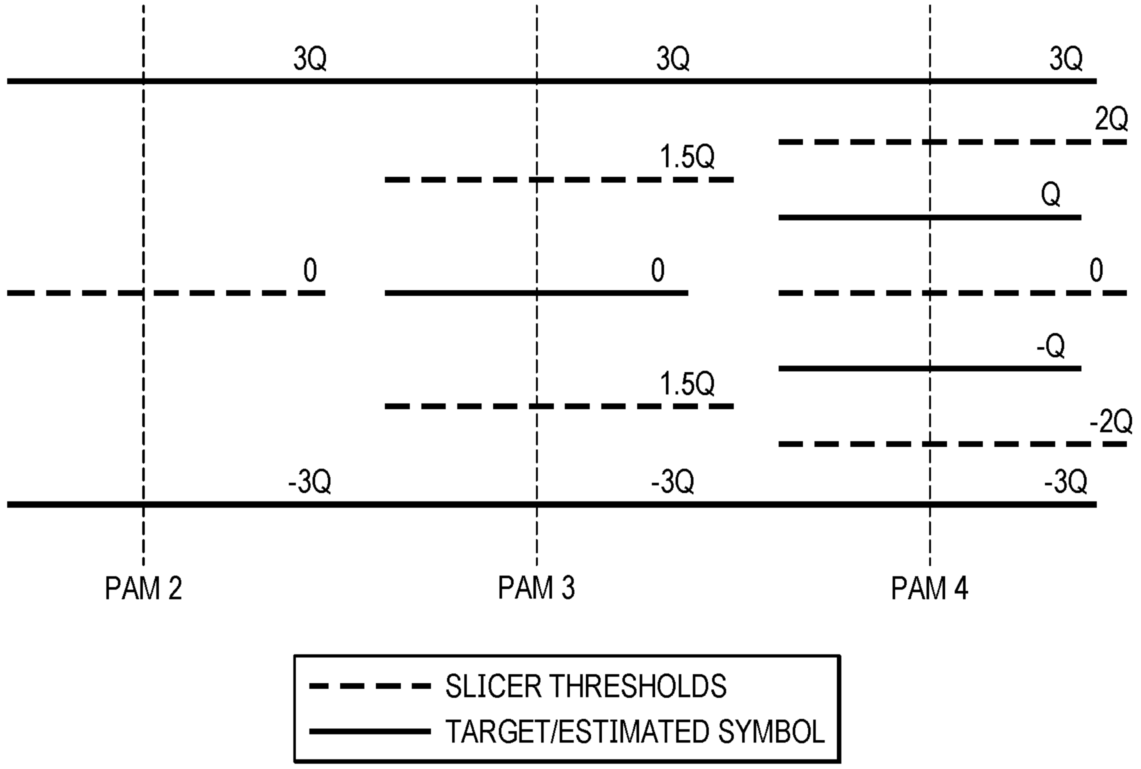
FIG. 8 shows target symbol levels and associated thresholds for different PAM modulation levels within ethernet using 3× slicer normalisation, according to an embodiment of this disclosure.

FIG. 8 shows target symbol levels and associated thresholds for different PAM modulation levels within ethernet using 3× Slicer normalisation levels, according to an embodiment of this disclosure. By using 3× slicer normalisation of target symbol levels of the slicer and associated thresholds also scaled to 3×, we can avoid the use of multipliers in the tap weighting blocks and coefficient adaption units. The 3× slicer normalisation ensures that all of the target symbol levels are integer multiples of the normalised digital value Q.

In this example, PAM-2 requires target symbol levels of −3Q or 3Q which can be distinguished using a threshold value of 0. PAM-3 requires target symbol levels of −3Q, 0 and 3Q, with threshold values of −1.5Q and 1.5Q. PAM-4 requires target symbol levels of −3Q, −Q, Q and 3Q, with threshold values of −2Q, 0 and 2Q. All of the target symbol values and thresholds required for PAM-2/3/4 are relatively straightforward to implement electronically. This can have a significant impact on the efficiency of the transceiver as a whole, as will be discussed below with reference to FIGS. 9 and 10.

Figure 9:
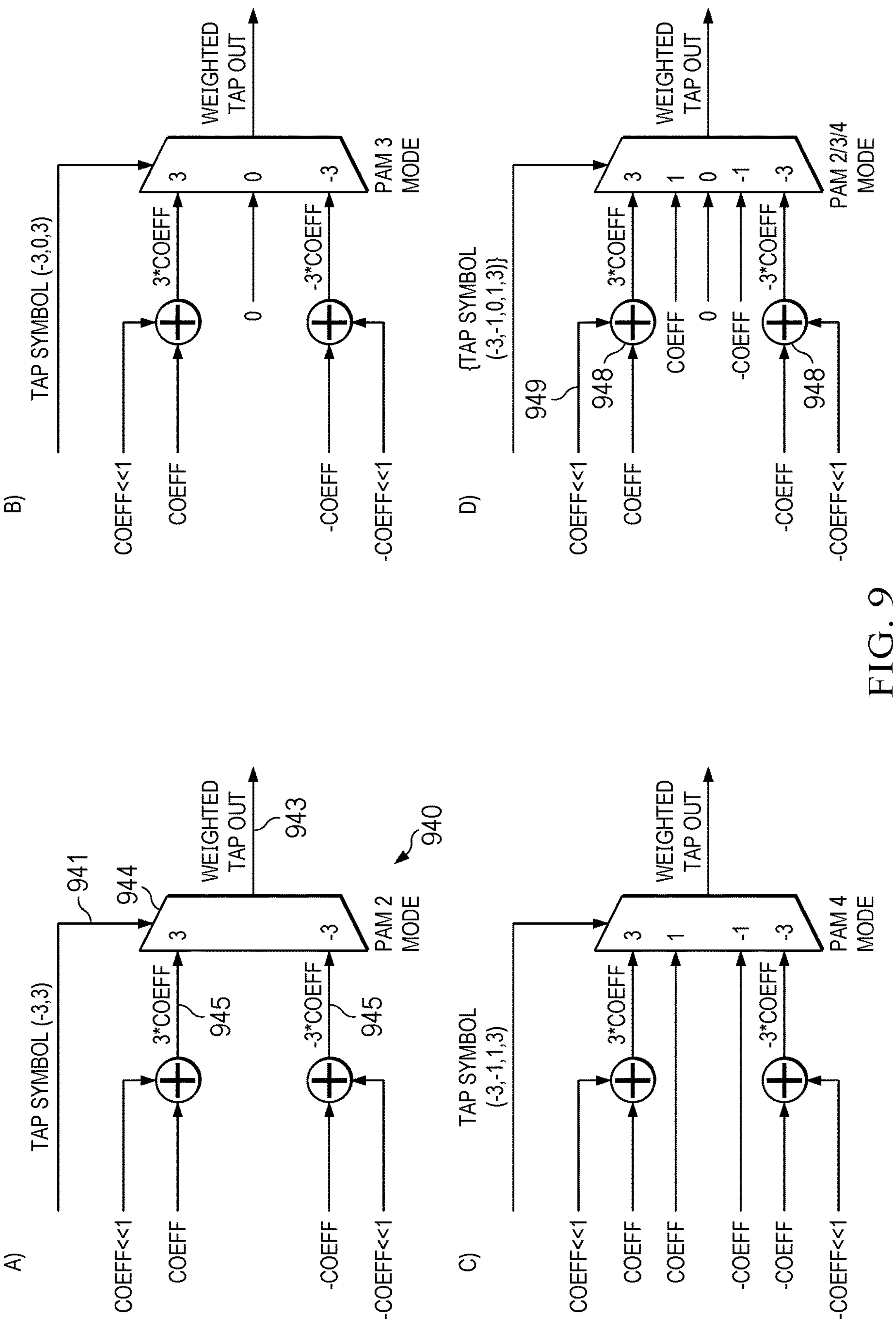
FIG. 9 shows example implementations of a tap weighting block, using the slicer thresholds shown in FIG. 8, according to an embodiment of this disclosure.

FIG. 9 shows example implementations of a tap weighting block 940, using the thresholds shown in FIG. 8, according to an embodiment of this disclosure. FIG. 9*a*) shows a tap weighting block 940 suitable for use with PAM-2. FIG. 9*b*) shows a tap weighting block suitable for use with PAM-3. FIG. 9*c*) shows a tap weighting block suitable for use with PAM-4. FIG. 9*d*) shows a tap weighting block suitable for use with PAM-2, PAM-3 and PAM-4.

In this embodiment, each tap weighting block 940 has much the same structure as its equivalent tap weighting block described in relation to FIG. 6 except the scaled coefficient signals are implemented differently. That is, each tap weighting block includes a multiplexer 944 with a plurality of multiplexer input terminals 945, a select terminal 941 and a multiplexer output terminal 943.

Each multiplexer input terminal 945 receives a scaled coefficient signal which is a version of the coefficient signal (received from the coefficient input terminal of the tap weighting block) which has been scaled by a different integer scaling factor. For a PAM-2 tap weighting block, the scaling factors are −3 and 3. For a PAM-3 tap weighting block, the scaling factors are −3, 0 and 3. For a PAM-4 tap weighting block, the scaling factors are −3, −1, 1 and 3. For a PAM-2/3/4 tap weighting block, the scaling factors are −3, −1, 0, 1 and 3. In this way, the PAM-2/3/4 tap weighting block is able to utilise any scaling factor which is required by any of PAM-2, PAM-3 or PAM-4.

Similarly to the tap weighting blocks described in relation to FIG. 6, the select terminal 941 is connected to the tap input terminal of the tap weighting block 940. In this way, it uses the value of a tap symbol received by the tap input terminal to set which of the scaled coefficient signals is provided as a tap output signal at the multiplexer output terminal 943. The multiplexer output terminal 943 is connected to the tap output terminal of the tap weighting block.

In this way, the adaptive filtering circuit can estimate an interference error signal from adapted coefficient signals which have been appropriately scaled to the target 3× normalised slicer levels from the received signal.

In this example, the tap weighting block includes one left shift operator to double the coefficient (positive and negative) 949, and one or more adders 948 that are configured to add the coefficient signal to the doubled coefficient signal 949 to provide the −3 and 3 integer scaling factors. In some other examples, the tap weighting blocks for any (or all) of PAM-2/3/4 include one or more adders 948 configured to add the coefficient signal to itself to provide the −3 and 3 integer scaling factors.

Adders 948 are simpler to implement than multiplier circuits and do not typically occupy as much area on the integrated circuit, nor do they typically consume as much power as a multiplier circuit. As previously discussed, a large number of tap weighting blocks 940 can be provided as part of the adaptive filtering circuit, and therefore the amount of space and power saved by using alternatives to multipliers can have a large cumulative effect on the efficiency of the transceiver as a whole, thereby providing a significant improvement.

Figure 10:
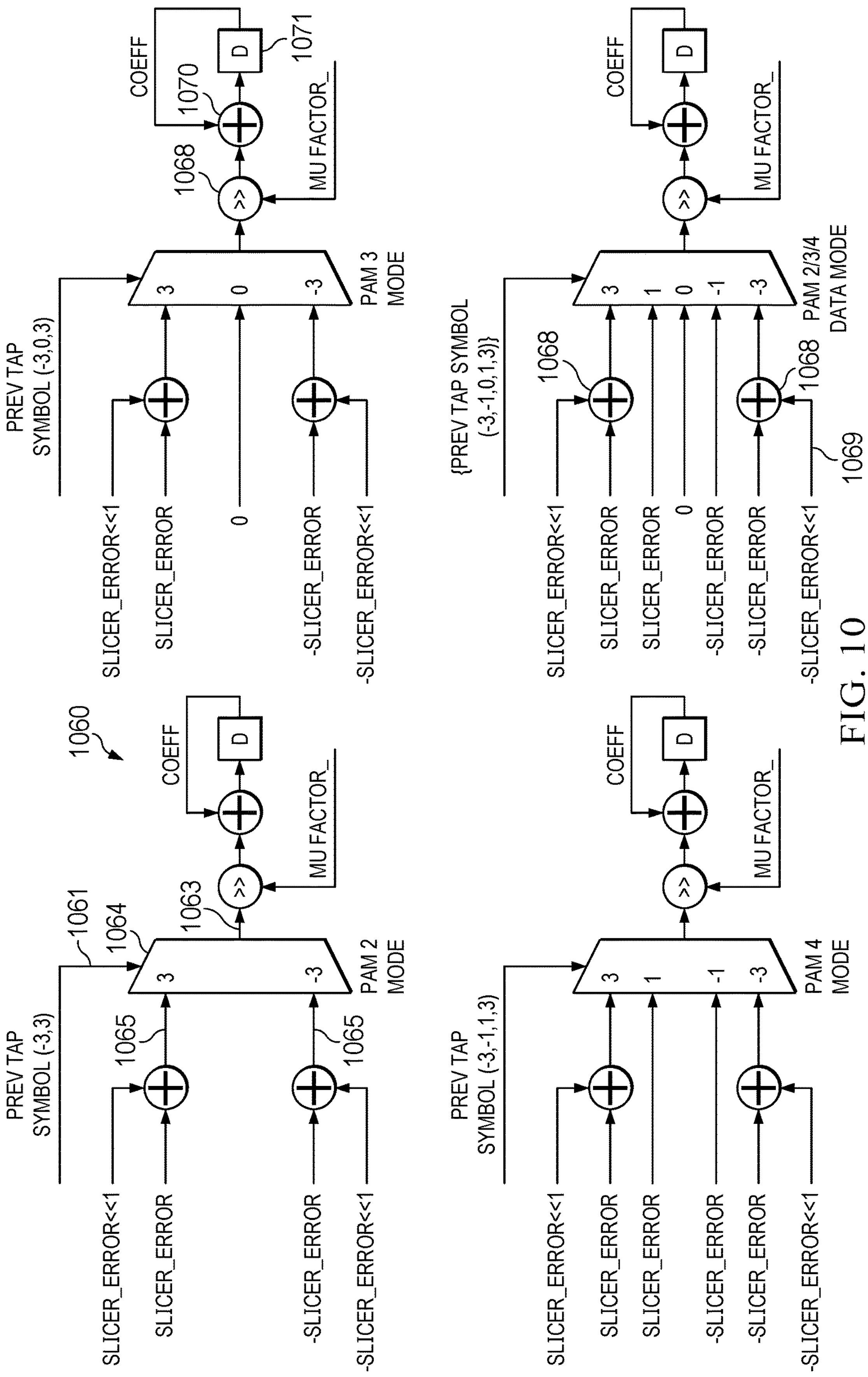
FIG. 10 shows example implementations of a coefficient adaption unit, which is a functional part of the coefficient adaption block of FIG. 3, using the slicer thresholds according to FIG. 8, according to an embodiment of this disclosure.

FIG. 10 shows example implementations of a coefficient adaption unit, which is a functional part of the coefficient adaption block of FIG. 3, using the thresholds according to FIG. 8, according to an embodiment of this disclosure. FIG. 10*a*) shows a coefficient adaption unit 1060 suitable for use with PAM-2. FIG. 10*b*) shows a coefficient adaption unit suitable for use with PAM-3. FIG. 10*c*) shows a coefficient adaption unit suitable for use with PAM-4. FIG. 10*d*) shows a coefficient adaption unit suitable for use with PAM-2, PAM-3 and PAM-4.

In this embodiment, each coefficient adaption unit 1060 has much the same structure as its equivalent coefficient adaption unit described in relation to FIG. 7 except the scaled slicer error signals are implemented differently. That is, each coefficient adaption units includes a multiplexer 1064 with a plurality of multiplexer input terminals 1065, a select terminal 1061, a multiplexer output terminal 1063, a shift register 1068, an adder 1070 and a delay block 1071.

Each multiplexer input terminal 1065 receives a scaled slicer error signal which is a version of the slicer error signal (received from a slicer error input terminal connected to the slicer error block) which has been scaled by a different integer scaling factor. For a PAM-2 coefficient adaption unit, the scaling factors are −3 and 3. For a PAM-3 coefficient adaption unit, the scaling factors are −3, 0 and 3. For a PAM-4 coefficient adaption unit, the scaling factors are −3, −1, 1 and 3. For a PAM-2/3/4 coefficient adaption unit, the scaling factors are −3, −1, 0, 1 and 3. In this way, the PAM-2/3/4 coefficient adaption unit is able to utilise any scaling factor which is required by any of PAM-2, PAM-3 or PAM-4.

The select terminal 1061 uses the value of a previous tap symbol to set which of the scaled slicer error signals is provided as an output signal at the multiplexer output terminal 1063. In order for the coefficient adaption unit 1060 to process: i) an interference symbol; and ii) a slicer error signal that corresponds to the same interference symbol, a delay block (or a multiple bit shift register) (not shown) is used to apply a delay to the received stream of interference symbols to provide a stream of previous tap symbols. The stream of previous tap symbols is aligned with the stream of slicer error signals that is received by the coefficient adaption unit, such that they represent or are derived from the same symbols in the received stream of interference symbols.

In this example, the coefficient adaption unit includes a left shift operator that is used to double the slicer error signal 1069 (by shifting the bits towards the MSB), and one or more adders 1068 are configured to add the slicer error signal to the doubled slicer error signal 1069 to provide the −3 and 3 integer scaling factors. In some other examples, the coefficient adaption units for any (or all) of PAM-2/3/4 include one or more adders 1068 configured to add the slicer error signal to itself to provide the −3 and 3 integer scaling factors.

The coefficient adaption block that is shown in FIG. 3 can contain one or more of the coefficient adaption units that are shown in FIG. 10. For example, there can be one coefficient adaption unit per tap of the adaptive filtering circuit, or one coefficient adaption unit for multiple taps of the adaptive filtering circuit.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A transceiver circuit comprising:

a receiver-input-terminal for receiving pulse amplitude modulation, PAM, network signals, wherein the PAM network signals can take a value according to a PAM modulation level of any of two-level modulation, three-level modulation or four-level modulation;

an adaptive filtering circuit comprising:

a filter-input-terminal for receiving a stream of interference-symbols;

a filter-output-terminal for providing an interference-error signal;

a plurality of tap weighting blocks, wherein each tap weighting block comprises:

a tap-input-terminal for sequentially receiving the stream of interference-symbols from the filter-input-terminal, such that each tap weighting block receives a different interference-symbol to the interference-symbol received by each other tap weighting block from the stream as a tap-symbol, a coefficient-input-terminal for receiving a coefficient signal, and a multiplexer comprising a plurality of multiplexer-input-terminals, a select-terminal and a multiplexer-output-terminal, wherein: each multiplexer-input-terminal is configured to receive a scaled coefficient signal, and each scaled coefficient signal is a scaled version of the coefficient signal, each scaled by a different integer scaling factor; the select-terminal is connected to the tap-input-terminal such that the multiplexer is configured to set which of the scaled coefficient signals is provided as a tap-output-signal at the multiplexer-output-terminal based on the value of the tap-symbol, wherein the multiplexer of each tap weighting block comprises five multiplexer-input-terminals; and one or more tap summation blocks configured to combine the tap-output-signals of each tap weighting block of the plurality of tap weighting blocks in order to provide the interference-error signal to the filter-output-terminal; and an interference cancellation block that is configured to subtract the interference-error signal from the PAM network signals to provide a processed-network-signal.

2. The transceiver circuit of claim 1 wherein the integer scaling factors are −3, −1, 0, 1 and 3.

3. The transceiver circuit of claim 2, wherein each tap weighting block further comprises an adder that is configured to add the coefficient signal to itself to provide the 3 and −3 integer scaling factors.

4. The transceiver circuit of claim 3, wherein each tap weighting block further comprises a shift register that is configured to double the coefficient signal and wherein the adder is configured to add the coefficient signal to the doubled coefficient signal to provide the 3 and −3 integer scaling factors.

5. The transceiver circuit of claim 1, further comprising:

a slicer connected to the interference cancellation block and configured to compare the processed-network-signal to a plurality of slicer thresholds and provide a received symbol such that the received symbol has one of a plurality of target values associated with the PAM modulation level of the PAM network signals.

6. The transceiver circuit of claim 5, further comprising a coefficient adaption unit configured to provide the coefficient signal.

7. The transceiver circuit of claim 6, further comprising a slicer error signal block configured to provide a slicer error signal, wherein the slicer error signal is the difference between the processed-network-signal and the received symbol, and wherein the coefficient adaption unit comprises:

at least one slicer error input terminal for receiving the slicer error signal, at least one interference symbol input terminal for receiving the stream of interference symbols, a delay block for applying a delay to the stream of interference-symbols to provide a stream of previous-interference-symbols such that the previous-interference-symbols are aligned with the slicer error signal that they represent, or are derived from, and a coefficient-output terminal for providing the coefficient signal;

wherein the coefficient adaption unit is configured to iteratively update the coefficient signal based on the slicer error signal and the aligned stream of previous-interference-symbols.

8. The transceiver circuit of claim 7, wherein the coefficient adaption unit is configured to:

apply a plurality of scaling factors to the slicer error signal to create a plurality of scaled slicer error signals, and select, based on the received previous-interference-symbols, one of the scaled slicer error signals to use to update the coefficient signal.

9. The transceiver circuit of claim 1, wherein:

the transceiver circuit is configured to:

in a first mode of operation: during a linkup procedure, process two-level modulation PAM network signals, and after the linkup procedure, process three-level modulation PAM network signals, and in a second mode of operation: during a linkup procedure, process two-level modulation PAM network signals, and after the linkup procedure, process four-level modulation PAM network signals, the transceiver circuit is configured to be switched between the first mode of operation and the second mode of operation.

10. The transceiver circuit of claim 1 wherein the transceiver circuit is configured to transmit and receive the PAM network signals via an ethernet network.

* * * * *